Figure 1:
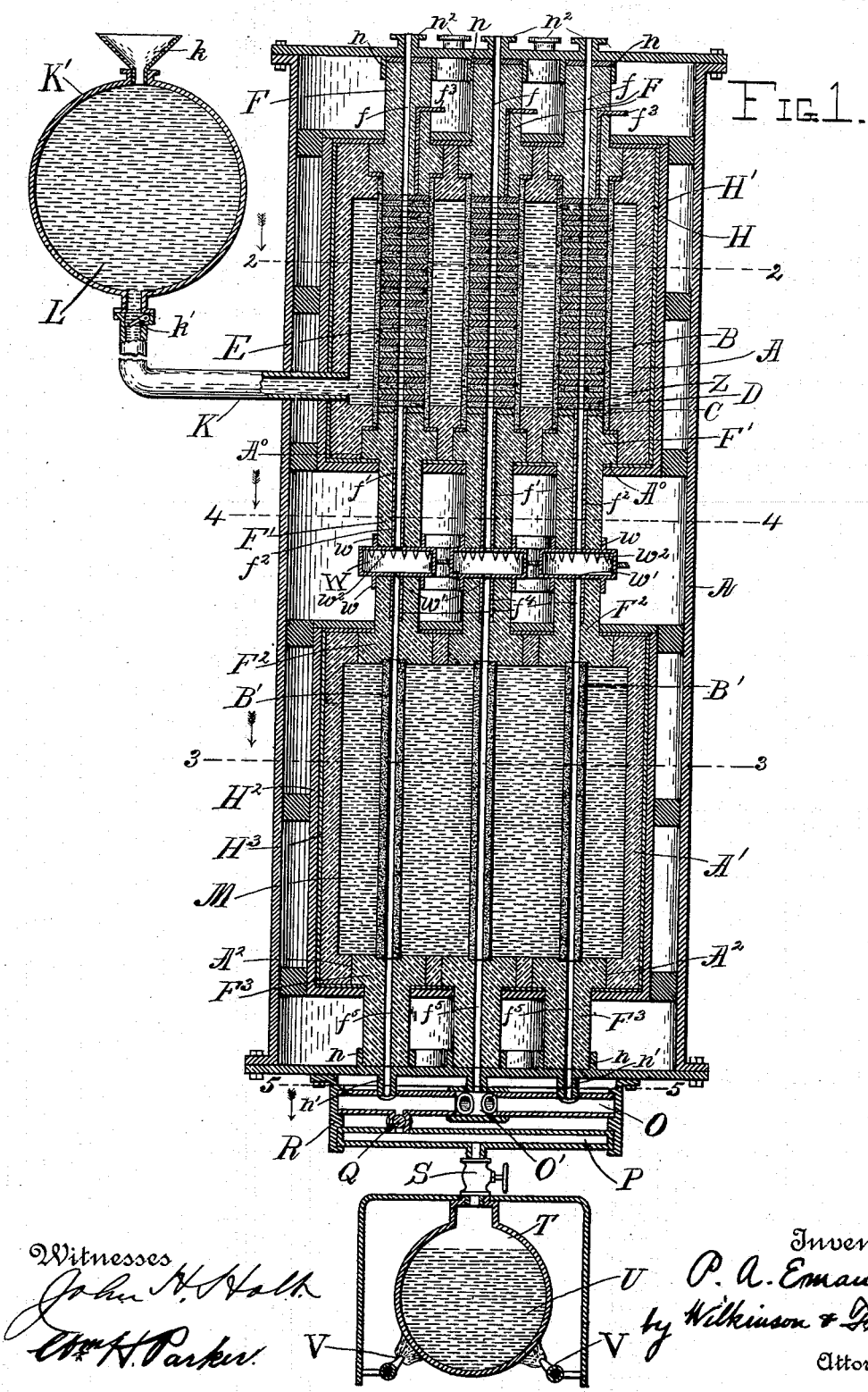

No. 615,540. Patented Dec. 6, 1898.
P. A. EMANUEL.
ELECTRIC BATTERY.
(Application filed May 17, 1898.)

(No Model.) 3 Sheets—Sheet 1.

Witnesses
John H. Holt
W. H. Parker

Inventor
P. A. Emanuel
by Wilkinson & Fisher
Attorneys

No. 615,540. Patented Dec. 6, 1898.
P. A. EMANUEL.
ELECTRIC BATTERY.
(Application filed May 17, 1898.)
(No Model.) 3 Sheets—Sheet 2.
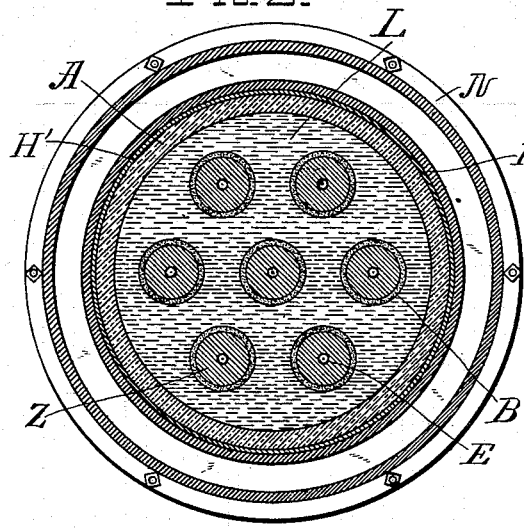
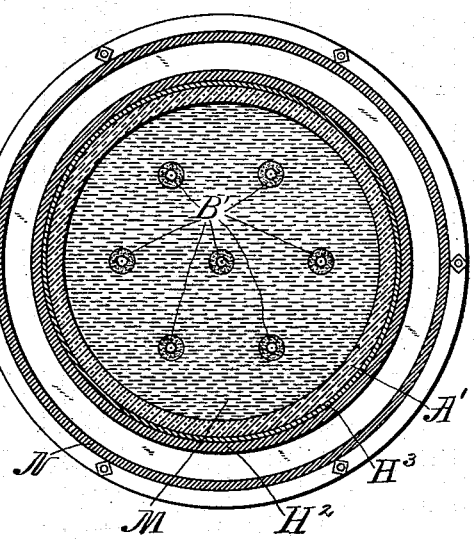
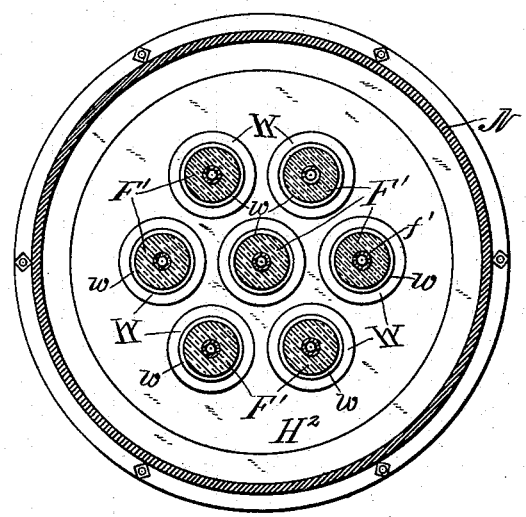
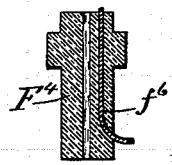

No. 615,540. Patented Dec. 6, 1898.
P. A. EMANUEL.
ELECTRIC BATTERY.
(Application filed May 17, 1898.)
(No Model.) 3 Sheets—Sheet 3.
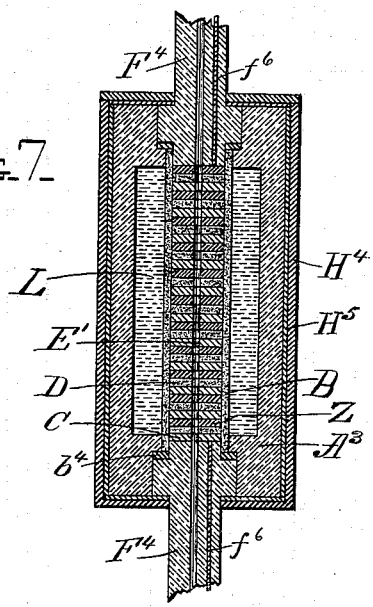
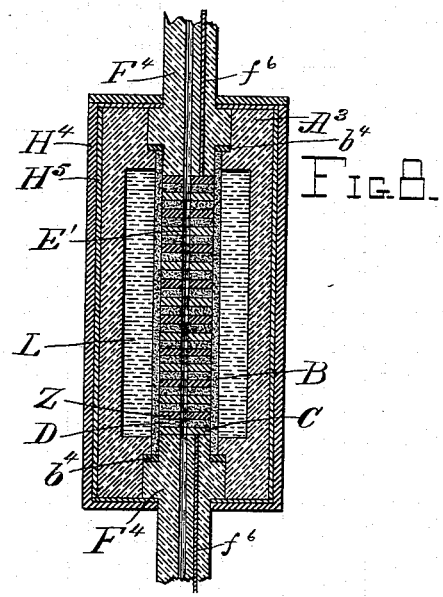
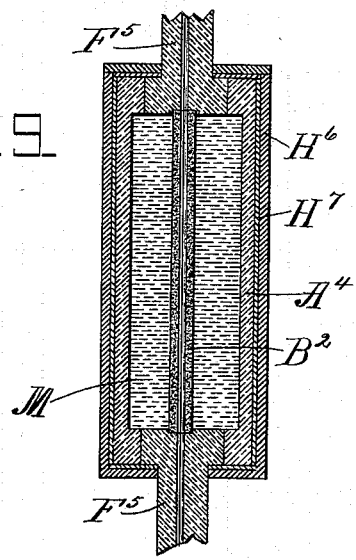
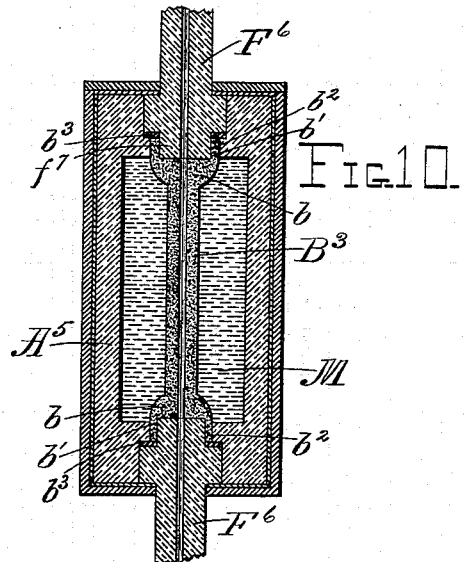
Witnesses
John H. Hall
Wm H. Parker
Inventor
P. A. Emanuel
by Wilkinson & Fisher
Attorneys

UNITED STATES PATENT OFFICE.

PHILIP ALBERT EMANUEL, OF AIKEN, SOUTH CAROLINA.

ELECTRIC BATTERY.

SPECIFICATION forming part of Letters Patent No. 615,540, dated December 6, 1898.

Application filed May 17, 1898. Serial No. 680,985. (No model.)

*To all whom it may concern:*

Be it known that I, PHILIP ALBERT EMANUEL, a citizen of the United States, residing at Aiken, in the county of Aiken and State of South Carolina, have invented certain new and useful Improvements in Electric Batteries; and I do hereby declare the following to be a full, clear, and exact description of the invention, such as will enable others skilled in the art to which it appertains to make and use the same.

My invention relates to improvements in electric batteries or apparatus for the generation of electric currents, and more especially to improvements upon certain well-known devices for accumulating the effects of dynamical or voltaic electricity.

The construction, objects, and advantages of my said invention will be more readily understood by referring to the accompanying drawings, in which—

Figure 1 represents a vertical central sectional view of my improved battery or generator. Fig. 2 represents a horizontal section of the same taken along the line 2 2 of Fig. 1 and looking in the direction of the arrow. Fig. 3 is a similar view of the said battery taken along the line 3 3 of Fig. 1, looking in the direction of the arrow. Fig. 4 represents also a horizontal section of the battery taken along the line 4 4 of Fig. 1 and looking in the direction of the arrow. Fig. 5 represents a horizontal section taken along the line 5 5 and also looking in the direction of the arrow. Fig. 6 represents a vertical central sectional view of one form of "stopper" employed with the battery. Fig. 7 represents a vertical central sectional view of a modified form of voltaic pile. Fig. 8 is a similar view of another form of voltaic pile. Fig. 9 represents a vertical central sectional view of a form of hydro-electric generator, and Fig. 10 is a similar view of another form of hydro-electric generator.

Similar letters refer to similar parts throughout the several views.

In the construction of this battery I have employed the principle discovered and made use of by Volta in the construction of his "pile," and in addition to this my improved battery or electric generator embodies improvements upon certain hydro-electric generating apparatus which will be hereinafter more fully explained.

Referring to the accompanying drawings, A represents a vessel, of glazed earthenware, glass, vulcanized fiber, hard rubber, or other non-conductor of electricity which may be found convenient for the purpose. At the top and bottom of this vessel are a plurality of openings $A^0$ opposite each other. Passing through the vessel A and having their ends secured in the openings $A^0$ are a plurality of porous tubes B, composed, preferably, of unglazed clay or earthenware or very porous wood or other suitable porous material. Within the tubes B are carried the elements C and Z, forming the voltaic piles. These elements will be described as composed of disks of copper and zinc, although other suitable metals may be used, if desired. The elements are placed in the tubes in the following order: Near the bottom of each tube is a disk, of copper, C, forming the negative element, and above and in contact with the copper disk is a disk D, of porous material, which may be composed of the same substance as the tubes B. Then above and resting on this porous disk D is a zinc disk Z, and above this zinc disk is another copper disk, plated or soldered to the zinc disk, and then a porous disk, and next above this porous disk is a zinc disk, and so on through the series until the pile terminates at the upper end of the tube with a zinc disk. All of these disks—the copper, zinc, and porous—are provided with a central aperture, so that when the disks are placed in the tubes the apertures register with each other and form a passage E through the centre of each pile. The elements may be joined together in any convenient manner.

Stoppers F and F' are inserted in each end of the tubes B and in the openings $A^0$ of the receptacle A. These stoppers are composed, preferably, of some non-conductor of electricity—such as glass, glazed earthenware, hard rubber, vulcanized fiber, wood, &c.—and securely seal the ends of the tubes B and openings $A^0$ outside of the elements, and at the same time hold the elements of the piles together, as shown. These stoppers F and F' are provided with small longitudinal passages $f$ and $f'$, respectively, which passages register with the passages E through the piles when the stoppers are in position. The passages $f'$ of the stoppers are lined with metal tubes $f^2$, which connect with the copper elements, and thus may form the positive terminals of the piles. Conductors $f^3$ pass through the upper stoppers $f$ and connect with the zinc elements, thereby forming the negative terminals or electrodes.

The vessel A is inclosed in a casing H of any suitable material, and between this casing and the vessel H is a packing of asbestos, cloth, rubber, or other suitable material H'. The necks of the stoppers F and F' pass through the said casing and packing, where the joints are made secure against any possibility of leakage. The interior of the vessel A is connected by means of suitable piping K with a vessel or receptacle K', which contains the electrolyte or exciting fluid L. This electrolyte or exciting fluid may be of any of the suitable and well-known kinds, but will be herein described as copper sulfate. The copper sulfate is poured into the vessel K' through the funnel $k$, when it will flow through the pipe K until it fills the vessel A, surrounding all of the tubes B. The vessel K' may then be filled up with copper sulfate, and so long as the pressure of the liquid upon the upper face of the valve $k'$ is greater than that upon its lower face the valve will remain open, as shown, and the copper sulfate allowed to flow into the vessel A. By capillary attraction and assisted somewhat by pressure the electrolyte or copper sulfate in the vessel A will pass through the pores of the tubes B and through the porous disks D, coming in contact with the copper and zinc elements and causing the well-known chemical action to take place. This, as is well known, produces an electric current between each pair of elements, which is increased as the elements of the pile are increased, the result being in principle the well-known Volta's pile. The electricity thus generated by the piles is taken off upon the conductors $f^2$, forming the positive terminals, and the conductors $f^3$ the negative terminals, and obviously these conductors may be connected in series or parallel. As the action of the cells or piles is continued copper will be deposited upon the faces of the copper elements or disks as fast as the zinc elements are dissolved. This will act to keep the distance between the elements constant, moving the porous disks continually toward the zinc disks, and therefore keeping the internal resistance constant so far as the distance between the elements affects the resistance. By locating the vessel K' above the piles the electrolyte will be forced through the porous tubes B, and disks D under pressure will enter the passages E and will be forced up through the passages $f$ of the stoppers and out through the outlets above the stoppers, when it may be discharged in any convenient manner. The electrolyte or exciting liquid being thus forced through the piles carries with it all of the impurities or waste products formed in the cell and discharges them continually, keeping an ever-fresh supply of the electrolyte or exciting fluid in contact with the elements. This is a great advantage, as the porous disks or tubes do not become clogged, as they do in most batteries and as they would do in this device were it not for the action above described. This tends to keep up the strength of the battery, pile, or generator and improve its efficiency generally. The flow of the liquid through the porous disks and tubes being very slow, as can well be imagined, the actual amount of exciting liquid consumed by such a process is not great. Now, if steam be passed up through the channels or passages E it will not only heat the copper sulfate, and thus increase its action, but it will, by causing a partial vacuum in the said passages, cause the copper sulfate or liquid surrounding the tubes B to more readily flow into the channels. If now this steam is charged with positive electricity by suitable means, hereinafter described, and then discharged in this electrified state into the channels or passages E, the negative electricity of the zinc will be absorbed by the positive electricity of the steam, and the difference of potential existing at the zinc and copper ends of the piles will be increased, and therefore the electromotive force will be increased. In order to obtain this supply of electrified steam, I have invented apparatus therefor dependent upon the same principle as Armstrong's hydro-electric machine. This electrifying apparatus is placed below the piles, and consists of a vessel A', composed of the same material as vessel A and provided with a plurality of openings $A^2$ at each end. The openings $A^2$ are closed by the stoppers $F^2$ and $F^3$, the latter being composed of the same material as the stoppers F and F', and also provided with central longitudinal passages $f^4$ and $f^5$.

Extending through the vessel A' and secured at each end in the stoppers $F^2$ and $F^3$ are a plurality of porous tubes B', so arranged that their passages register with the passages of the stopper $F^2$ and $F^3$. The interior of the vessel A' is filled with water M, which surrounds all of the tubes B'. The vessel A' is inclosed in a suitable casing $H^2$ and packing $H^3$, similar to that of the vessel A. N represents an outer casing, of metal or other suitable material, inclosing both vessels A and A'. This casing N is provided at each end with a series of flanged sockets $n$, into which the ends of the stoppers F and $F^3$ fit tightly. The ends of this casing are also provided with inlets $n'$ and outlets $n^2$, which register, respectively, with the passages through the stoppers $F^3$ and F. The inlets are connected to the radiating-pipes O, which latter are connected to a chamber P through the valve Q. The pipes O all meet in a union O' and are supported at their outer ends in the frame R, which latter also carries the chamber P and is secured to the lower end of the casing, as shown. The chamber P is connected by suitable piping and valve S to a boiler T, containing water U. Heat may be applied to this boiler in any convenient way. This heat is shown in the drawings as derived from gas-jets V; but I do not wish to confine myself to any such source, as coal, wood, or other furnaces may be substituted therefor.

Between the stoppers F' and $F^2$ are located metallic expanding-chambers W, each of which is provided with flanged sockets $w$, adapted to receive the ends of the stoppers F' and $F^2$. These chambers W have apertures $w'$, which register with the passages through the stoppers, and around the outside of these apertures the chambers make contact with the metal tubes $f^2$ and $f^4$. A plurality of points $w^2$ extend downward from the inside of the tops of said chambers, the object of which will presently appear.

Assuming that steam is generated in the boiler T and that the valves Q and S are open, the steam will pass through the pipes O into the passages $f^5$ of the stoppers and then through the porous tubes B'. The valve Q may operate so as to admit steam continually or intermittently, as may be desired. When the steam thus passes into the tubes B', it will cause vesicles of water from the supply M to pass into the tubes and mingle with the steam and pass with the steam up through the tubes. This steam laden with vesicles of water and passing up through the tubes B, the passage through the tubes being very small, the steam will become charged with electricity, and when the said steam passes into the expanding-chambers W it will expand and partially condense. This latter action will further electrify the steam, some of the electricity being accumulated on the points $w^2$, while the rest passes with the steam up through the passages of the stoppers F' and into the piles, where it acts upon the latter, as before described. Thus it will be seen how the effect of the piles is strengthened by the employment of the electrifying device in connection therewith. As to the theory of the electrified steam physicists differ. Some think that the electricity is due to the expansion of the steam. Others have held that the rapid condensation of the steam produces the electricity, while Faraday held that the electricity arose purely from the friction of vesicles of water in the steam with the substance through which they pass. Therefore it will be seen that my device embodies all of these theories and affords the most practical way of joining all of the ideas. The tubes $f^2$ while acting as conductors from the piles to the expanding-chambers also act to strengthen the stoppers, as do also the tubes $f^4$.

It is too well known to require explanation that the half of the voltaic pile which terminates with the zinc element is charged with negative electricity, while that end which terminates with the copper element is charged with positive electricity. My invention adds to this charge of positive electricity the high-potential electricity of the steam which is accumulated in the chambers upon the points $w^2$ and passes on into the pile, as explained. The chambers W may form the positive terminals of the generator and may be connected together in any convenient way. All of the joints around the casing and stoppers are made tight and secure by packing or otherwise in order to prevent any escape of steam or liquid.

The device shown in Fig. 1 may be varied in many respects without departing from the spirit of my invention. Thus the stoppers F' instead of being provided with the tubes $f^2$ as conductors may be made without these tubes, as shown in Fig. 6, and have a conductors $f^6$ passing through the body of the stopper, as shown. In this instance the conductor $f^6$ may be connected to the expanding-chambers in any convenient way or not connected to them at all, as may be desired; also, instead of inclosing all of the piles in one vessel, as A, each pile may have a separate vessel, and in addition the order or mode of arranging the elements of the piles may be varied. These modifications are shown in Figs. 7 and 8, where $A^3$ represents the vessel in which is carried the electrolyte L and pile, $H^4$ the metallic casing, and $H^5$ the packing. The stoppers $F^4$ are in this case provided with the conductors $f^6$ and may be made of the same kind of material as the other stoppers are made of. The vessel in this case may be composed of the same material as the vessel A.

In Fig. 7 the elements C and Z and porous disks D are arranged in the same order as in Fig. 1; but in the device shown in Fig. 8 this order is changed and more closely resembles the original voltaic pile. In this latter case the bottom element is a copper disk, as before, then a porous disk upon it, and upon this a zinc disk, then a copper disk, then a porous disk, then a zinc disk, and copper disk, and so on through the pile, terminating at the top with a zinc disk.

In both of the devices shown in Figs. 7 and 8, the piles are provided at each end with packing $b^4$. The steam-electrifying portion of the device also may be changed, so that each porous tube will be carried within a separate chamber or vessel, as shown in Figs. 9 and 10, where $A^4$ and $A^5$ represent the vessels carrying the porous tubes $B^2$ and $B^3$ and electrolyte L.

In the device shown in Fig. 9 the shape of the porous tube and mode of securing the same in the vessel by the stoppers $F^5$ are the same as described in connection with the tubes B of Fig. 1; but in Fig. 10 this tube is somewhat changed, as is the mode of securing the same in the vessel. The tube $B^3$ is enlarged at each end, as at $b$, and recessed at $b'$, which forms a circular flange $b^2$ at each end of the tube. Into the socket or recess $b'$ of the tube fits the projection $f^7$ of the stoppers $F^6$, and between the ends of the flange $b^2$ and the stopper is inserted the packing $b^3$. The flanges $b^2$ of the tube also fit into the ends of the vessel $A^5$, forming a steam and water tight joint. Indeed, my invention may be varied and modified in a great many ways without departing from the spirit of the same; but

What I claim, and desire to secure by Letters Patent of the United States, is—

1. An electric-battery cell or voltaic pile, which consists of a plurality of positive and negative elements placed alternately one above the other, a casing of porous material inclosing said elements, a vessel containing said porous casing, and an electrolyte carried within said vessel, substantially as described.

2. The combination with a vessel, of a plurality of porous tubes passing through the said vessel, a voltaic pile carried within each of said tubes and an electrolyte carried by said vessel and surrounding said tubes, substantially as described.

3. An electric-battery cell or voltaic pile, which consists of a plurality of positive and negative elements placed alternately one above the other, porous diaphragms separating said elements, a casing of porous material inclosing the said elements and said porous diaphragms, a vessel containing said porous casing, and an electrolyte carried within said vessel and surrounding said porous casing, substantially as described.

4. An electric-battery cell or voltaic pile, which consists of a plurality of positive and negative elements placed alternately one above the other, porous diaphragms placed between elements of opposite polarity, a casing of porous material closely inclosing said elements and diaphragms, a vessel containing said porous casing, an electrolyte carried within said vessel and surrounding said porous casing, means for closing the ends of said porous casing, and an outside casing inclosing said vessel, substantially as described.

5. In an electric-battery cell or voltaic pile, the combination of a plurality of positive and negative elements consisting of metal disks, the said positive and negative elements being arranged alternately one above the other, porous diaphragms placed between elements of opposite polarity, a porous tube inclosing said elements and diaphragms, a vessel containing said tube, and an electrolyte carried within said vessel and adapted to surround said tube, substantially as described.

6. In an electric battery or voltaic pile, the combination of a plurality of positive and negative elements consisting of metal disks, the said positive and negative elements being arranged alternately one above the other, porous diaphragms placed between elements of opposite polarity, a plurality of porous tubes, each of said tubes containing a plurality of said elements and diaphragms, a vessel containing said tubes, and an electrolyte carried within said vessel and adapted to surround said tube, substantially as described.

7. In an electric-battery cell or voltaic pile, the combination of a plurality of positive and negative elements consisting of metal disks, the said positive and negative elements being arranged alternately one above the other, porous diaphragms placed between elements of opposite polarity, a porous tube containing said positive and negative elements and said diaphragms, with a passage passing through said elements and diaphragms longitudinally of said tube, a vessel containing said tubes, and an electrolyte carried within said vessel and surrounding said tube, substantially as described.

8. In an electric battery or voltaic pile, the combination of a plurality of positive and negative elements consisting of metal disks, the said positive and negative elements being arranged alternately one above the other, porous diaphragms placed between elements of opposite polarity, a plurality of porous tubes each containing a plurality of said elements and diaphragms, with a passage passing through said elements and diaphragms longitudinally of said tubes, a vessel containing said tubes, and an electrolyte contained in said vessel and surrounding said tubes, substantially as described.

9. In an electric-battery cell or voltaic pile, the combination of a plurality of positive and negative elements placed alternately one above the other so as to form a voltaic pile, with a passage passing longitudinally through said pile, a porous casing inclosing said elements, a vessel containing the said porous casing, an electrolyte carried within the said vessel and surrounding said porous casing, and means for passing steam through the said passage of the pile, substantially as described.

10. In an electric-battery cell or voltaic pile, the combination with a vessel having openings at each end, of a porous tube carried within said vessel and having its ends secured in said openings, a plurality of positive and negative plates adapted to fit the bore of said tubes and to be inclosed within the same one above the other, porous diaphragms interposed between positive and negative plates within said tube, the said plates and porous diaphragms being provided with apertures through them which form a passage extending through the pile formed by the plates, stoppers inserted in said openings at each end of said vessel and closing the ends of the said porous tube, each of said stoppers having a longitudinal passage through it and adapted to connect with the passage through said pile, conductors passing through said stoppers and connecting with said plates, a casing inclosing the said vessel, an electrolyte carried within said vessel and surrounding said tube, and a second vessel also containing electrolytic liquid and connected with the interior of the first vessel, substantially as described.

11. In an electric battery or voltaic pile, the combination of a vessel having a plurality of openings at each end, porous tubes carried within said vessel and having their ends secured in said openings, a plurality of positive and negative plates adapted to fit into the bore of said tubes and to be inclosed one above the other in said tubes, porous diaphragms interposed between positive and negative plates within said tubes, the said plates and porous diaphragms being provided with apertures through them which form a passage extending through the piles formed by the said plates, stoppers inserted in the openings at each end of said vessel and closing the ends of said tubes, each of said stoppers being provided with a passage passing longitudinally through it and adapted to connect with the passages through said piles, conductors passing through said stoppers and connecting with said plates, a casing inclosing the said vessel, an electrolyte carried within said vessel and surrounding said tubes and a second vessel containing electrolytic liquid and connected with the interior of the first vessel, substantially as described.

12. The combination with a vessel, of a plurality of porous tubes passing through the said vessel, a voltaic pile carried within each tube, said piles having a passage passing longitudinally through them, an electrolyte carried by said vessel and surrounding said tubes, and means for forcing the said electrolyte through said tubes and between the elements of said piles and into said passages, substantially as described.

13. The combination with a vessel, of a plurality of porous tubes passing through the said vessel, a voltaic pile carried within each of said tubes, an electrolyte, a second and separate vessel containing said electrolyte and connected with the interior of the first vessel, so that said electrolyte may flow from the second vessel into the first and surround the said porous tubes, substantially as described.

In testimony whereof I affix my signature in presence of two witnesses.

PHILIP ALBERT EMANUEL.

Witnesses:
J. W. COCHRANE,
JAMES ALDRICH.